(12) United States Patent
Evangelisti et al.

(10) Patent No.: US 12,391,075 B2
(45) Date of Patent: Aug. 19, 2025

(54) ROTARY FEED-THROUGH, IN PARTICULAR FOR REGULATING TYRE PRESSURE

(71) Applicant: Trelleborg Wheel Systems Italia S.p.A, Tivoli-Villa Adriana (IT)

(72) Inventors: Andrea Evangelisti, Tivoli-Villa Adriana (IT); Enrico Pieralice, Tivoli-Villa Adriana (IT)

(73) Assignee: TRELLEBORG WHEEL SYSTEMS ITALIA S.P.A., Tivoli-Villa Adriana (IT)

( * ) Notice: Subject to any disclaimer, the term of this patent is extended or adjusted under 35 U.S.C. 154(b) by 414 days.

(21) Appl. No.: 18/040,106

(22) PCT Filed: Jul. 22, 2021

(86) PCT No.: PCT/IB2021/056640
§ 371 (c)(1),
(2) Date: Jan. 31, 2023

(87) PCT Pub. No.: WO2022/029538
PCT Pub. Date: Feb. 10, 2022

(65) Prior Publication Data
US 2023/0339270 A1    Oct. 26, 2023

(30) Foreign Application Priority Data
Aug. 7, 2020    (IT) .................. 102020000019774

(51) Int. Cl.
*B60C 23/10*    (2006.01)
*B60C 23/00*    (2006.01)
(Continued)

(52) U.S. Cl.
CPC .. *B60C 23/00347* (2020.05); *B60C 23/00372* (2020.05); *F16C 19/06* (2013.01); *F16C 41/005* (2013.01); *F16C 2310/00* (2013.01)

(58) Field of Classification Search
CPC ............ B60C 23/001; B60C 23/00305; B60C 23/00309; B60C 23/00372
See application file for complete search history.

(56) References Cited

U.S. PATENT DOCUMENTS

| 5,253,688 A | 10/1993 | Tigges |
| 2016/0152100 A1 | 6/2016 | Berkness et al. |

FOREIGN PATENT DOCUMENTS

| DE | 8907153 U1 | 8/1989 |
| DE | 102011014025 B4 | 6/2017 |

(Continued)

OTHER PUBLICATIONS

International Search Report and Written Opinion issued in International Application No. PCT/IB2021/056640, on Oct. 6, 2021 (12 pages).

*Primary Examiner* — Justin R Fischer
(74) *Attorney, Agent, or Firm* — Bookoff McAndrews, PLLC

(57) ABSTRACT

A rotary feed-through, designed to transfer a fluid between two entities in rotary motion with respect to one another. The rotary feed-through includes an inner cylindrical ring and an outer cylindrical ring, which are free to turn with respect to one another and provided with channels for passage of the fluid. The channels are connected via at least one annular space axially delimited by seal rings housed in a cylindrical seat. The cylindrical seat faces radially outwards or inwards and is axially delimited, on one side, by an axial abutment of the inner and outer cylindrical rings and, on the other side, by an axial abutment of a lid, a closing ring, or an intermediate ring. The seal rings are interference fitted to the inner or outer cylindrical ring and provided with an elastic portion for contact with the surface of the inner or outer cylindrical ring.

12 Claims, 5 Drawing Sheets

(51) Int. Cl.
*B60C 29/06* (2006.01)
*F16C 19/06* (2006.01)
*F16C 41/00* (2006.01)

(56) References Cited

FOREIGN PATENT DOCUMENTS

| | | |
|---|---|---|
| DE | 102018100750 A1 | 7/2019 |
| EP | 0071278 A2 | 2/1983 |
| EP | 2613950 B1 | 8/2014 |
| EP | 2647511 B1 | 3/2015 |
| EP | 2810795 B1 | 12/2016 |
| WO | 2015195028 A1 | 12/2015 |

ROTARY FEED-THROUGH, IN PARTICULAR FOR REGULATING TYRE PRESSURE

CROSS-REFERENCE TO RELATED APPLICATIONS

This patent application is the national stage entry of International Patent Application No. PCT/IB2021/056640, filed on Jul. 22, 2021, which claims the benefit of priority to Italian Patent Application No. 102020000019774, filed on Aug. 7, 2020.

FIELD

The present invention concerns a rotary feed-through for transferring a fluid between two entities, one of which is in rotary motion with respect to the other, in particular for regulating tyre pressure.

The invention refers in particular to the field of tyres for agricultural, earth-moving and forestry use, but can be employed in all applications that require regulation of the tyre pressure, in particular to adapt the pressure on the basis of the specific use and, more in general, for transferring a fluid between two entities, one of which is in rotary motion with respect to the other.

BACKGROUND

It is known that vehicles for agricultural use are required to move on various types of terrain. In particular, these vehicles can be used both on the road and on the land. According to the type of use there is the need to have a tyre with different inflation pressures.

In fact, when an agricultural vehicle is working on the land, a low inflation pressure of the tyres enables a lower fuel consumption, consequent upon an increase in traction, and moreover reduces compaction of the soil. Instead, on the road it is necessary to increase the inflation pressure to reduce fuel consumption and improve stability of the vehicle.

Traditionally, the problem of traction on the land can be partially solved via the aid of ballasts, which, by increasing the vertical load, press the tyre against the ground, increasing the value of the area of contact, and hence of the dimensions of the impression, with the effect of increasing the amount of surface of the tyre useful for traction. The increase in the dimensions of the impression may, however, be obtained also by reducing the internal pressure of the tyre. This mechanism of regulation is more effective for the purposes of frequent adaptability (ballasting involves actions of installation and removal performed on the wheel that cannot be implemented immediately), considering the numerous variables involved and continuously changing during the operations on the land. In this sense, mainly two variables are to be considered:
  the vertical load acting on the tyre, which is due to the contributions of:
    a. the weight of the vehicle itself and of the possible suspended tools that the vehicle itself can lift; and
    b. vertical effects due to traction, connected to the use of specific work tools that are towed or semi-suspended;
  the effects of shape and hardness of the terrain, deriving from the characteristics of penetrability intrinsic to the terrain itself and from other factors due to the dynamics of interaction of the tyre with the terrain, such as, for example, the speed of advance.

The optimal working conditions on the land, where the pressure requires regulations depending upon the type of tyres, the vehicle and the operating conditions, and on the road, where the pressure has to be higher, can be combined via a purposely provided pressure-regulation system.

According to the prior art, to give rise to this variation of pressure various possibilities exist, which are, however, burdensome both from the standpoint of implementation and from the economic standpoint.

In particular, with more specific reference to the solutions that envisage installation of the devices in the space inside the rim, i.e., on the side of the rim that does not face outwards, it is possible to distinguish two groups, a first group relative to devices integrated in the axle of the vehicle and a second group relative to devices not integrated in the axle, respectively.

The main problem connected to adoption of solutions belonging to the first group regards the need to adapt each device to the specific components of the vehicle on which they are to be installed, with the consequent need for the manufacturer of the device to adapt its specific technique to each series/model of vehicle to be equipped. In addition, then, this category of solutions requires an increase in maintenance costs, in view of the high level of integration in the axle.

Instead, the solutions belonging to the second group entail a limited applicability of the system to the rear axles in a bar-axle configuration; however, applicability to the flanged rear axles and to the front steering axles in general excluded remains. This limit is linked to the need for rotary feed-throughs of large diameter (with respect to the diameters that characterize the first group) that use sealing systems that operate at high peripheral velocities and are, at the same time, subject to a radial and axial play critical from the functional standpoint.

Moreover, as may be appreciated with reference, by way of example, to the German patent for utility model No. DE 8907153 and to the U.S. Pat. No. 5,253,688, which show systems for controlling the pressure in a tyre where a tube connects an air channel, defined by the tyre and the rim, and compression means that are integrated in the vehicle on which the wheel is mounted (in the case in point, a tractor), systems of this type present the considerable difficulty that consists in the passage of air between the vehicle and the wheel system, which is in rotation with respect to the vehicle. This entails the use of complicated gasket and joint systems for guaranteeing the seal, in addition to the fact that this type of integrated system must necessarily be provided beforehand and cannot be mounted on vehicles already on the market.

The European patent No. EP 2613950 B1 discloses a system for regulating the tyre pressure for motor vehicles, which has a rotor flange inserted in a circular groove open in a direction radial to the rotor, where part of the circular grooves, closed by activated gaskets, form circular chambers.

The European patent No. EP 2647511 B1 discloses an annular rotary feed-through for a system for regulating the tyre pressure of a tractor, with a sliding segment provided with a radial hole for connection of the terminal arranged on the vehicle side of the stator ring and of the terminal arranged on the wheel side of the stator.

The European patent No. EP 2810795 B1 discloses a rotary feed-through for a unit for controlling the tyre pressure of an agricultural vehicle, for example a tractor, which has a non-return valve that is formed with blocking elements that extend within the annular chamber concentrically with the axis of rotation of the rotor.

The international application No. WO 2015/195028 A1 discloses a sealing assembly for a vehicle. The sealing assembly is pre-arranged for transferring air between an axle of the vehicle and a hub, which surrounds the axle. In this sealing assembly, the air-seal devices and the environmental-seal devices are positioned in a respective casing provided within the axle of the vehicle.

The U.S. patent application No. US 2016/152100 A1 discloses an apparatus for transferring air between an axle of a vehicle, in particular an engine axle, and a corresponding rim of a wheel of the vehicle, in particular a drive wheel. The apparatus is integrated within the axle of the vehicle. Mounting of the apparatus on the rim is not envisaged.

The German patent application No. DE 102018100750 A1 discloses another apparatus for transferring air between an axle of a vehicle and a corresponding rim of a wheel of the vehicle. The apparatus comprises a hollow cartridge, which is housed in the axle, exploiting the internal cavity thereof. Also in this case, mounting of the apparatus on the rim is not envisaged.

The European patent application No. EP 0071278 A2 discloses a system for automatic inflation/deflation of tyres for a vehicle. The system is provided with a stator that axially prolongs the axle of the vehicle. The system is moreover provided with a rotor, which is also mounted on the axle of the vehicle and comprises an independent sealing assembly fitted thereon. Also in this case, mounting of the system on the rim is not envisaged.

Finally, the German patent No. DE 102011014025 B4 discloses an agricultural vehicle, for example a tractor, which has a rotary feed-through for a unit for controlling the tyre pressure where an annular rotor is supported in a rotary way with respect to the stator ring, and where the gaskets are arranged coaxially between the rotor and the stator ring along the axial direction.

The solution according to the German patent No. DE 102011014025 B4 presents some limitations due, from an architectural standpoint, to the high complexity (there being envisaged as many as four components of the rotor, two stators, three spacers, four disk-shaped sealing surfaces, two O-rings, two scrapers, a plug and bearings). The spacers, having the task of facilitating installation of the gaskets, render it, however, more problematical to provide the correct pre-load for installation, as well as to prevent the sealing disks from sliding out of their seat during the pressure cycles. Furthermore, the contact interface of the sealing disk with the rotor is a sliding surface, not a linear contact, deriving from which is a high resistant torque. The contact of the sealing disk decreases during wear of the sealing disks on account of the fixed offset and of the rigid housing of the gasket, with the consequence that long-term sealing is not guaranteed.

The solution according to the German patent No. DE 102011014025 B4 may also entail instability of the rotary feed-through from a functional standpoint, from a kinematic standpoint, and from the standpoint of providing a seal for the air under pressure. There are in fact no elements that can maintain the mutual position of the stator components and of the rotor components when the latter are in rotation. In addition, no housing is envisaged for the sealing assemblies that is independent with respect to a housing for the bearings: this renders the working condition both of the gaskets and of the bearings unstable.

SUMMARY

The solution according to the present invention fits into this context and has the purpose of guaranteeing the possibility of regulating the tyre pressure, in particular a tyre for agricultural use, earth moving, and forestry purposes, via a system that is fitted or can be fitted on the inner side of the disk of the rim of a wheel, i.e., on the side that does not face outwards, and that can be easily adapted for being mounted on pre-existing rims, without requiring any modification of the architecture of the vehicle axle and without any limit in terms of applicability on front and rear wheel axles.

The scope of the present invention is hence to provide a rotary feed-through for a system for regulation of the tyre pressure, in particular tyres for agricultural use, earth-moving, and forestry purposes, that will make it possible to overcome the limits of rotary feed-throughs according to the known art and to achieve the technical results described previously.

A further scope of the invention is to provide said rotary feed-through for a system for regulating the tyre pressure at substantially contained costs, both as regards the costs of production and as regards the costs of maintenance and replacement of the components.

Not the least important scope of the invention is to propose a rotary feed-through for a system for regulating the tyre pressure, in particular tyres for agricultural use, earth-moving, and forestry purposes that will be simple, safe, and reliable.

Consequently, forming a specific object of the present invention is a rotary feed-through designed to transfer a fluid between two entities, one of which is in rotary motion with respect to the other, said rotary feed-through comprising two coaxial cylindrical components, respectively defined as inner cylindrical ring and outer cylindrical ring, which are free to turn with respect to one another and are respectively provided with one or more inner channels and one or more outer channels for the passage of said fluid, each of said one or more inner channels and each of said one or more outer channels being connected via at least one annular space, each annular space being axially delimited by two seal rings, said seal rings being housed in a cylindrical seat of said inner cylindrical ring or of said outer cylindrical ring, said cylindrical seat facing radially outwards or inwards, respectively, and being respectively axially delimited on one side by an axial abutment made of a single piece with, or coupled to, said inner cylindrical ring or said outer cylindrical ring, and on the other side by an axial abutment of a lid coupled in a removable way to said inner cylindrical ring or of a closing ring or of an intermediate ring, coupled in a removable way to said outer cylindrical ring, said seal rings being respectively interference fitted to said inner cylindrical ring or to said outer cylindrical ring and being provided with an elastic portion for contact with the surface of said outer cylindrical ring or of said inner cylindrical ring, respectively; and said rotary feed-through comprising means that prevent the axial movement of said inner cylindrical ring with respect to said outer cylindrical ring.

At least one bearing is arranged between the inner cylindrical ring and the outer cylindrical ring configured for supporting both the radial load and the axial load between the inner cylindrical ring and the outer cylindrical ring. Preferably, a pair of bearings is arranged between the inner cylindrical ring and the outer cylindrical ring.

The inner cylindrical ring is provided with at least one first shoulder, whilst the outer cylindrical ring is provided with at least one second shoulder that is set in front of a respective first shoulder. Each bearing is arranged between a first shoulder and a second shoulder, so that each bearing constitutes at least one axial constraint in regard to the possibility of mutual axial sliding between the inner cylindrical ring and the outer cylindrical ring. This axial constraint is functional for maintaining the mutual position between the inner cylindrical ring and the outer cylindrical ring during mutual rotation.

Advantageously, each one between the inner cylindrical ring and the outer cylindrical ring is manufactured of a single monolithic piece.

In particular, according to the invention, said cylindrical seat of said inner cylindrical ring or of said outer cylindrical ring is respectively axially delimited on one side by a first tab of said inner cylindrical ring or by a second tab of said outer cylindrical ring, and on the other side by a tab of a lid coupled to said inner cylindrical ring or by a tab of a closing ring or by an intermediate ring, coupled to said outer cylindrical ring.

According to an embodiment example of the rotary feed-through, the first tab of the inner cylindrical ring is made of a single piece with said inner cylindrical ring, whilst the second tab of the outer cylindrical ring is made of a single piece with said outer cylindrical ring.

Preferably, the first shoulder is made on the first tab of the inner cylindrical ring. This first tab of the inner cylindrical ring is oriented radially towards the outside of the rotary feed-through. Once again preferably, the second shoulder is made on the second tab of the outer cylindrical ring. This second tab of the outer cylindrical ring is, instead, oriented radially towards the inside of the rotary feed-through, in such a way that the first tab of the inner cylindrical ring at least partially overlies, in a radial direction, the second tab of the outer cylindrical ring in the assembled configuration of the rotary feed-through. The bearing arranged between the first shoulder of the first tab of the inner cylindrical ring and the second shoulder of the second tab of the outer cylindrical ring constitutes a first axial constraint in regard to the possibility of mutual axial sliding between the inner cylindrical ring and the outer cylindrical ring.

In addition, there may also be envisaged a first shoulder made on the tab of the closing ring. This tab of the closing ring radially faces the inside of the rotary feed-through. Likewise, there may also be envisaged a second shoulder made on the tab of the lid. The bearing arranged between the first shoulder of the tab of the closing ring and the second shoulder of the tab of the lid constitutes a second axial constraint in regard to the possibility of mutual axial sliding between the inner cylindrical ring and the outer cylindrical ring. This second axial constraint is functional for maintaining, in co-operation with the first axial constraint, the mutual position between the inner cylindrical ring and the outer cylindrical ring.

According to an embodiment example of the rotary feed-through, the first shoulder is provided on the inner cylindrical ring, at the end delimited by the lid. Once again according to the same embodiment example of the rotary feed-through, the second shoulder is instead made on the tab of the closing ring, so that a single bearing is arranged between said first shoulder and said second shoulder. This single bearing has the function of maintaining the mutual position between the inner cylindrical ring and the outer cylindrical ring.

Preferably, according to the present invention, said elastic contact portion comprises a rotary sealing element formed by a lip protruding from said seal ring housed in said cylindrical seat of said inner cylindrical ring or of said outer cylindrical ring and with the end respectively in contact with the inner surface of said outer cylindrical ring or with the outer surface of said inner cylindrical ring.

Even more preferably, the elastic contact portion of each seal ring comprises a first seal lip, which is oriented in the direction of a respective inner channel and has the function of keeping the annular space under pressure, and a second seal lip, which is oriented in the direction of the bearing and has the function of providing hydraulic tightness in regard to lubricating fluids present in the area occupied by said bearing. Alternatively, the elastic contact portion of each seal ring may comprise a single seal lip, which is oriented in the direction of the annular space and performs the dual task of keeping said annular space under pressure and of providing a hydraulic tightness in regard to lubricating fluids present in the area occupied by the bearing.

Moreover, once again according to the invention, the feed-through may comprise two environmental seal rings, which are respectively arranged at the two axial ends of said rotary feed-through, with interference both with said inner cylindrical ring and with said outer cylindrical ring, and which are preferably compound seal rings, namely, comprising a first rotary part, fixed with respect to the entity in rotary motion, and a second static part, designed to be fixed with respect to the other entity.

Once again according to the present invention, said seal rings are kept separate by an annular spacer, said annular spacer being positioned in each annular space and defining an outer annular space arranged on the side of said annular spacer facing said outer cylindrical ring, said annular spacer comprising one or more radial connection channels between said annular space and said outer annular space.

The effectiveness of the rotary feed-through for a system for regulating the tyre pressure according to the present invention emerges clearly, it makes available a solution potentially adaptable to the rims of existing tractors, without modifications of structural architectures of axles and hubs, with a limited number of components and hence with lower costs linked to production and maintenance requirements.

DESCRIPTION OF THE DRAWINGS

The present invention will now be described, by way of illustrative but non-limiting example, according to some preferred embodiments thereof, with particular reference to the attached drawings, wherein.

DETAILED DESCRIPTION

Figure 1A:
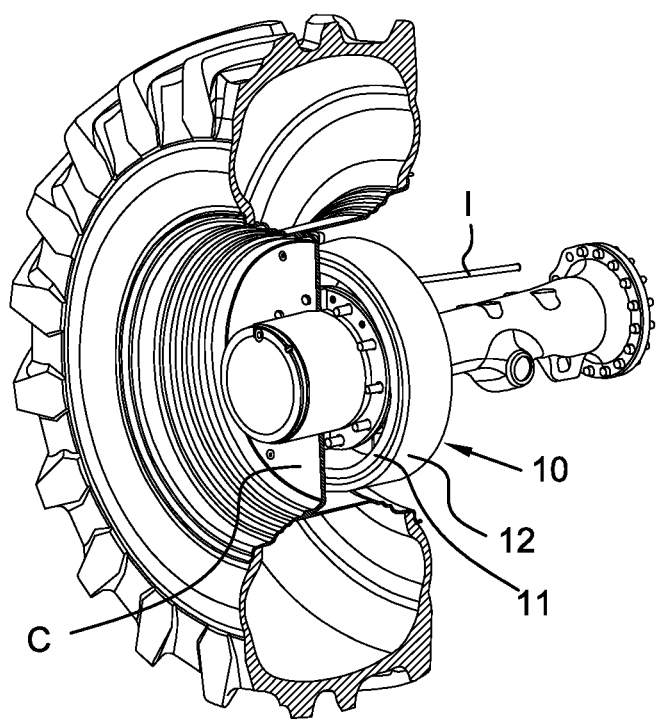
FIG. 1a is a front perspective view, partially sectioned, of a tyre applied on which is a rotary feed-through according to a first embodiment of the present invention.

With preliminary reference to FIG. 1*a*, a rotary feed-through according to a first embodiment of the present invention, suitable for use with air as fluid to be transferred from a first entity to a second entity said entities being in rotary motion with respect to one another, is indicated as a whole by the reference number 10 and is applied to a wheel system comprising a rim C and a tyre P. In particular, as will be specified more fully in the following description, the rotary feed-through 10 is constituted by two coaxial cylindrical components, which are able to rotate with respect to one another, and is mounted on the side of the rim C facing the vehicle, via coupling between the rim C and one of said coaxial cylindrical components (in the case shown by way of non-limiting example with reference to the figures, the cylindrical component 12 with larger radius), without having any impact on the original components of the wheel system, and can be installed indistinctly on solutions of rigid or steering axles of any agricultural vehicle.

Figure 1B:
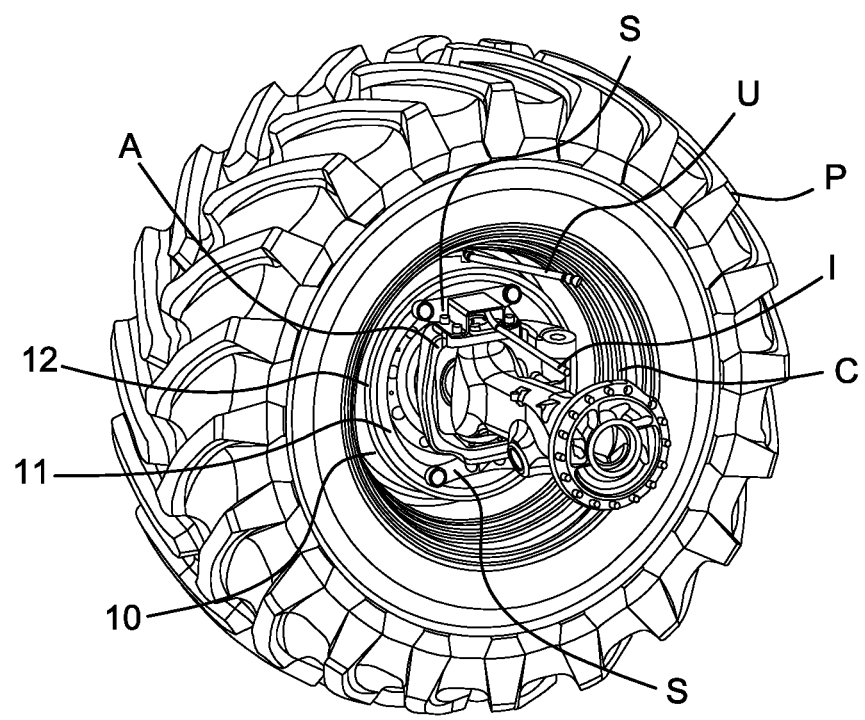
FIG. 1b is a rear perspective view of a front axle applied on which is a rotary feed-through according to a first embodiment of the present invention.

With reference to FIG. 1*b*, the cylindrical component of the rotary feed-through 10 that is not coupled to the rim C, which in the case shown purely by way of non-limiting example in FIG. 1*b* is the cylindrical component 11 with smaller radius, is coupled to the axle A, in the specific case shown in FIG. 1*b* by means of brackets S, the geometry of which is represented purely by way of example. However, the example does not rule out alternative solutions that can be applied to further forms of rigid or steering axles of any agricultural vehicle.

Figure 2:
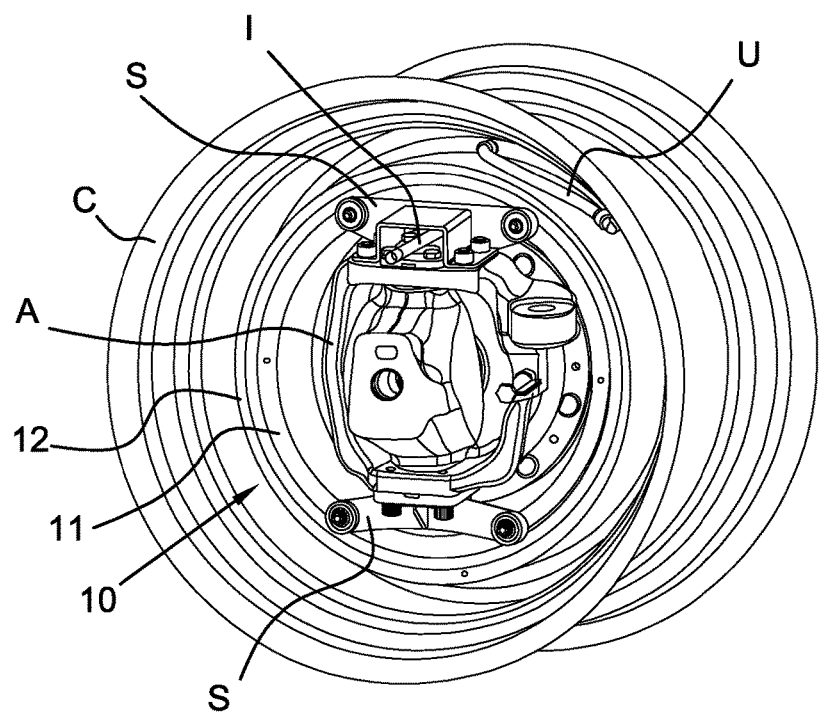
FIG. 2 is a rear perspective view of the feed-through of FIG. 1.
Figure 3:
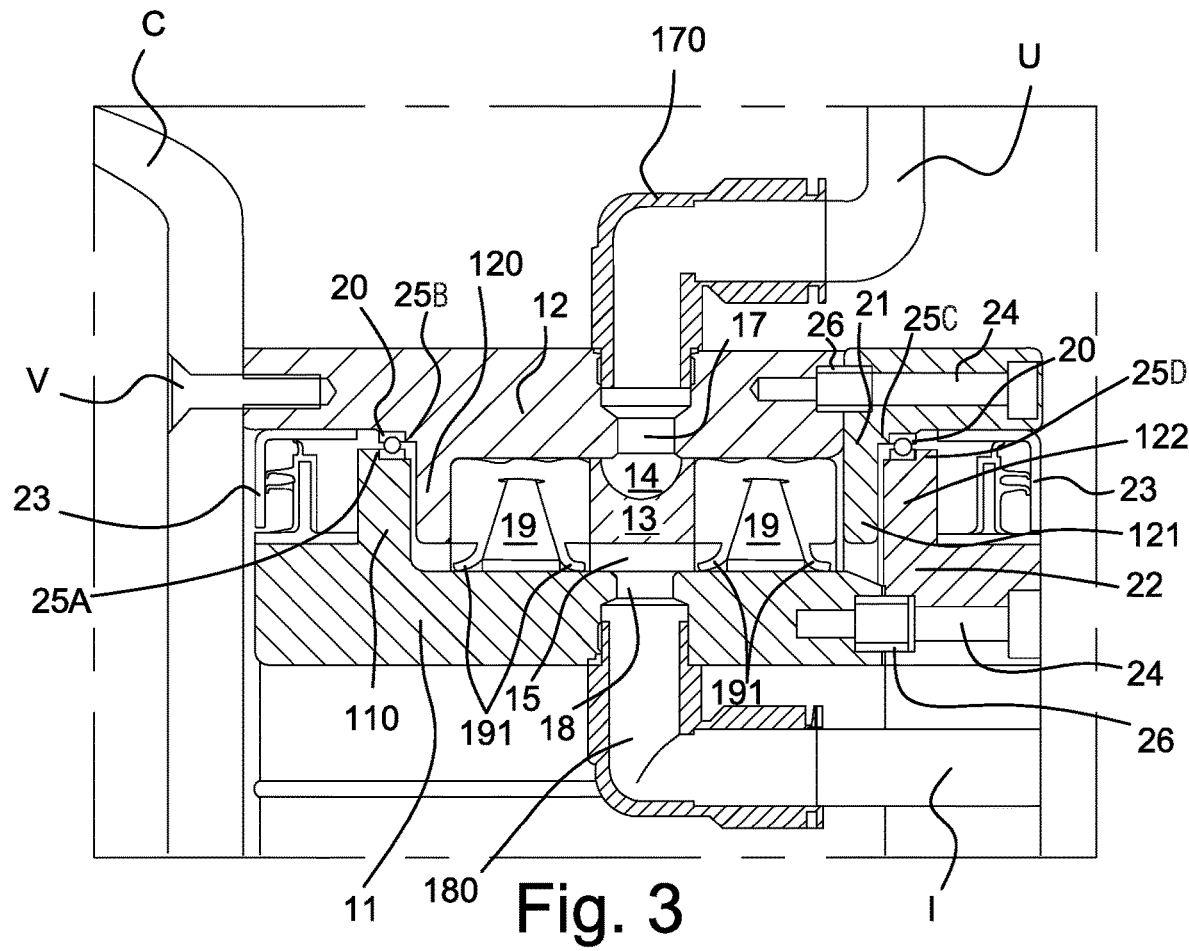
FIG. 3 is a sectional view of a portion of the feed-through of FIG. 1 and of the elements for inlet and outlet of the fluid that are connected, via said feed-through, respectively from a second static entity connection with the wheel axle to a second, dynamic, entity in rotary motion with respect to the first entity and fixed with respect to the wheel.

With reference to FIG. 2, as already anticipated previously, the rotary feed-through 10 is made up of two coaxial cylindrical components, respectively a cylindrical component 11 with smaller radius, in what follows defined as the inner cylindrical ring 11, and a cylindrical component 12 with larger radius, in what follows defined as the outer cylindrical ring 12. In the embodiment shown with reference to FIG. 2, the inner cylindrical ring 11 is fixed with respect to the frame of the vehicle and is kept stationary with respect to said frame by means of a system of brackets S. In particular, the inner cylindrical ring 11 has at least one threaded hole for fixing the inner cylindrical ring 11 to the axle A, and can present a greater number of threaded holes for optimizing the coupling with the axle A via clamping and according to the type of configuration of the axle shaft. Instead, the outer cylindrical ring 12 is fixed with respect to the rim C of the wheel and is coupled to said rim C by means of clamping screws (one of which is shown in FIG. 3 and is designated by the reference V) evenly distributed along the base circumference of said outer cylindrical ring 12. In particular, the outer cylindrical ring 12 has at least three threaded holes arranged on its circumference in positions evenly spaced apart, for fixing the outer cylindrical ring 12 to the rim C of the wheel by means of as many clamping screws V. The outer cylindrical ring 12 may have more than three threaded holes arranged on its circumference in positions evenly spaced apart to optimize coupling with the rim C. Alternatively, according to other possible embodiments of the present invention, the inner cylindrical ring 11 can be coupled to the rim C and behave as rotor, and the outer cylindrical ring 12 can be coupled to the axle A and assume the role of stator, according to the configurations of rigid or steering axles of any agricultural vehicle.

FIGS. 1-3 moreover show the connection tube I between inflation means (not shown) fixed with respect to the frame of the vehicle and the rotary feed-through 10, as well as the connection tube U between the rotary feed-through 10 and the innertube of the tyre P.

Figure 4:
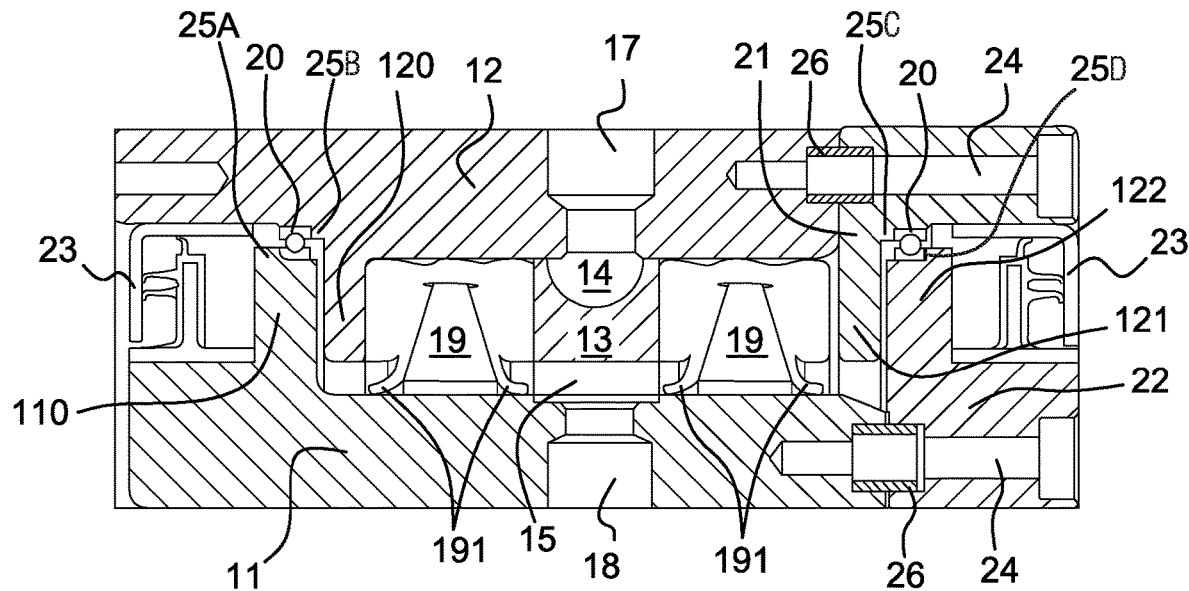
FIG. 4 is a sectional view of a detail of the portion of FIG. 3 of the feed-through of FIG. 1.
Figure 5:
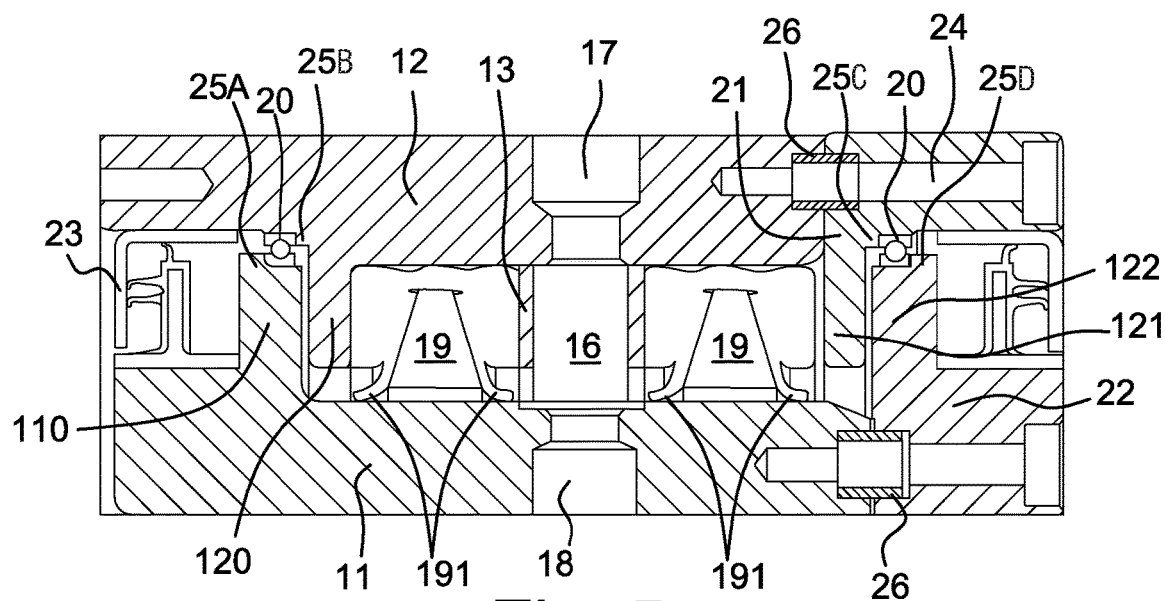
FIG. 5 is a sectional view of a detail of a different portion of the feed-through of FIG. 1, that is coaxial but with a different angle with respect to the portion shown in FIG. 4.

With reference to FIGS. 3-5, the inner cylindrical ring 11 has, in the proximity of its end that is to face the rim C, a first shoulder 25A made on a first tab 110 oriented radially towards the outside of the rotary feed-through 10, whilst the outer cylindrical ring 12 has, in the proximity of its end that is to face the rim C, a second shoulder 25B made on a second tab 120 oriented radially towards the inside of the rotary feed-through 10. During assembly of the rotary feed-through 10, in the embodiment shown with reference to FIGS. 3-5, the inner cylindrical ring 11 is fitted on the outer cylindrical ring 12 by placing at least one bearing 20 (in the case shown by way of non-limiting example, this bearing 20 is of a ball-bearing type) until the first shoulder 25A of the first tab 110 of the inner cylindrical ring 11, which is located on the side of the rotary feed-through 10 facing the rim C, is brought in front of the second shoulder 25B of the second tab 120 of the outer cylindrical ring 12. The bearing 20 is arranged between the first shoulder 25A of the first tab 110 of the inner cylindrical ring 11 and the second shoulder 25B of the second tab 120 of the outer cylindrical ring 12 and constitutes a first axial constraint in regard to the possibility of mutual axial sliding between the inner cylindrical ring 11 and the outer cylindrical ring 12. This first axial constraint is functional for maintaining, in co-operation with a corresponding second axial constraint provided in the proximity of the end of the rotary feed-through 10 that is to face the side further away from the rim C, and that will be described in what follows, the mutual position between the inner and outer cylindrical rings 11, 12.

Furthermore, once again with reference to FIGS. 3-5, mounted on the end of the outer cylindrical ring 12 opposite to the one facing the rim C is a closing ring 21, proper positioning of which can be conveniently guaranteed, by way of example, as shown in FIGS. 3-5, by means of centring bushings 26, but could also be obtained by a centring step or according to other equivalent solutions. The closing ring 21 comprises a first shoulder 25C made on a tab 121, facing radially towards the inside of the rotary feed-through 10. Moreover, the closing ring 21 is fixed to the outer cylindrical ring 12 by means of a clamping system, which may be, as shown, by way of example, in FIGS. 3-5, a screw 24. Once the closing ring 21 has been rendered fixed with respect to the outer cylindrical ring 12 by means of the clamping system, the tab 121 of the closing ring 21, together with the second tab 120 of the outer cylindrical ring 12, axially delimits a cylindrical seat of the outer cylindrical ring 12, facing the inner cylindrical ring 11 and designed to house the seal rings 19, which will be described hereinafter. In the embodiments of the present invention, described and shown by way of non-limiting example with reference to the attached figures, the closing ring 21 is represented on the side of the rotary feed-through 10 further away from the rim C, but alternatively it could be arranged on the opposite side, at the same time, the second tab 120 of the outer cylindrical ring 12 being arranged on the side further away from the rim C, with consequent modifications of the structure of the rotary feed-through 10, with respect to what is described and shown in the attached figures, that fall within the knowledge of a person skilled in the art.

Finally, the structure of the rotary feed-through 10 is closed by means of a lid 22, proper positioning of which can be conveniently guaranteed, by way of example, as shown in FIGS. 3-5, by means of centring bushings 26, but could also be obtained by means of a centring step or according to other equivalent solutions and, in the embodiment shown by way of example with reference to FIGS. 3-5, comprises a second shoulder 25D of a tab 122, which is arranged, on the opposite side with respect to the rim C, in front of the first shoulder 25C of the tab 121 of the closing ring 21, a bearing 20 being arranged between the second shoulder 25D of the tab 122 of the lid 22 and the first shoulder 25C of the tab 121 of the closing ring 21 (by way of example, in the embodiment shown in FIGS. 3-5, a ball bearing), the function of which is to constitute a second axial constraint in regard to the possibility of mutual axial sliding between the inner cylindrical ring 11 and the outer cylindrical ring 12. This second axial constraint is functional for maintaining, in co-operation with the corresponding first axial constraint provided in the proximity of the end of the rotary feed-through 10 that is to face the rim C, described previously, the mutual position between the inner cylindrical ring 11 and the outer cylindrical ring 12.

In the embodiments of the present invention described and shown by way of non-limiting example with reference to the attached figures, the lid 22 is represented on the side of the rotary feed-through 10 further away from the rim C, but alternatively it could have been arranged on the opposite side, at the same time the first tab 110 of the inner cylindrical ring 11 being arranged on the side further away from the rim C, with consequent modifications of the structure of the rotary feed-through 10, with respect to what is described and shown in the attached figures, that fall within the knowledge of a person skilled in the art.

In particular, the bearings 20 may be of the thin-section type, to meet the requirements of compactness of the system. Respect of the right mounting tolerances in the axial direction is guaranteed through calibration of the thicknesses.

Preferably, the inner cylindrical ring 11, the outer cylindrical ring 12, the closing ring 21, and the lid 22 are made of metal material, chosen in consideration of the mechanical strength, the surface finish and the hardness of each component. There may be allowed also solutions using other materials (by way of non-limiting example, a techno-polymeric material) or composite materials.

Once again preferably, the inner cylindrical ring 11 is made of a single monolithic piece, constituted, preferably but not exclusively, by a metal material. Even more preferably, the first tab 110 of the inner cylindrical ring 11 is made of a single piece with said inner cylindrical ring 11. Likewise, the outer cylindrical ring 12 is made of a single monolithic piece, constituted, preferably but not exclusively, by a metal material. Even more preferably, the second tab 120 of the outer cylindrical ring 12 is made of a single piece with said outer cylindrical ring 12. These technical characteristics enable simplification of the architecture of the rotary feed-through 10 according to the present invention as compared, for example, to the rotary feed-through according to the German patent No. DE 102011014025 B4.

In positions corresponding to the cylindrical seat of the outer cylindrical ring 12, axially defined by the second tab 120 of the cylindrical ring 12 and by the tab 121 of the closing ring 21, and preferably in positions corresponding to the axially more central part of the cylindrical seat, the outer cylindrical ring 12 has one or more outer channels 17, arranged along the circumference of the outer cylindrical ring 12, while the inner cylindrical ring 11 has one or more inner channels 18, arranged along the circumference of the inner cylindrical ring 11. According to the embodiment shown by way of example in FIGS. 3-5, said one or more outer channels 17 and said one or more inner channels 18 are arranged with a radial orientation, but it is also possible for the same outer and inner channels 17, 18, or at least one of the two channels, to assume an axial orientation. In particular, with reference to FIG. 3, represented therein are an outer channel 17, connected to the connection tube U between the rotary feed-through 10 and the inner tube of the tyre P by means of a first connector 170, and an inner channel 18, connected to the connection tube I, configured for connecting inflation means (not shown) fixed with respect to the frame of the vehicle and the rotary feed-through 10 by means of a second connector 180. In particular, said one or more outer channels 17, as likewise the entire outer cylindrical ring 12, are fixed with respect to the rim C of the wheel and hence to the air channel of the tyre P, whereas said one or more inner channels 18, as likewise the entire inner cylindrical ring 11, are fixed with respect to the frame of the vehicle and, through this, to a tank for supply of compressed air for inflation of the tyre P.

The cylindrical seat of the outer cylindrical element 12 hence defines a space that guarantees pneumatic connection between said one or more outer channels 17 and said one or more inner channels 18. The pneumatic tightness of said space is ensured via two seal rings 19, arranged in the cylindrical seat of the outer cylindrical ring 12, respectively on the two axially opposite sides of the cylindrical seat. These seal rings 19, at the same time, also guarantee a hydraulic tightness in regard to lubricating fluids present in the area occupied by the bearings 20, having the task of guaranteeing frictionless rotation between the inner cylindrical ring 11 and the outer cylindrical ring 12. This hydraulic tightness is necessary, in particular, in the case in which said bearings 20 are of the non-shielded type.

In particular, said seal rings 19 are configured in such a way as to allow a variable radial positioning, linked to the run-out that derives from the geometry of the inner ring 11 and of the closing ring 21 with respect to the outer ring 12 and to the lid 22 and that is preferably contained within the limits of 0.2 mm, to allow the seal rings 19 to adapt to the effect of the deformations due to the air pressurizations within the cylindrical seat of the outer cylindrical ring 12. The seal rings 19 are configured so as to allow an axial positioning that is fixed with respect to the inner surface of the outer cylindrical ring 12, on which these seal rings 19 are fitted, and that is due to the interaction by mechanical interference with the outer cylindrical ring 12 and, at the same time, is self-centring with respect to the latter. Finally, said seal rings 19 (fixed with respect to the outer ring 12) maintain, in regard to the inner cylindrical ring 11, a variable axial positioning which is also preferably contained within the limits of 0.2 mm, guaranteed by the fact that the housing of the seal rings 19 is laterally defined by the second tab 120 of the outer cylindrical ring 12 and by the tab 121 of the closing ring 21.

In particular, the seal rings 19 are constituted by a body made of elastomeric material on the outer surface, such as to allow for the seal the right level of adhesion by interference with respect to the inner surface of the outer cylindrical ring 12 on which this seal is fitted.

In the radially inner surface of the seal rings 19, instead, the seal has at least one rotary sealing element, commonly referred to as "lip" and designated by the reference number 191, which can be activated by the pressure present within the annular space 15 axially comprised between the two seal rings 19. The outer surface of the inner cylindrical ring 11 on which the lips of the seal rings 19 rest is characterized by low roughness and by high hardness to guarantee pneumatic tightness, low friction, and withstand wear due to the sliding effect of the gaskets.

By way of non-limiting example, represented in FIGS. 3-5 is the architecture of the seal rings 19, which each have two seal lips 191. A first seal lip 191 of each seal ring 19 is oriented in the direction of the inner channel 18. The function of this first seal lip 191 is to maintain the annular space 15 axially comprised between the two seal rings 19 under pressure. The second seal lip 191 of each seal ring 19 is instead oriented in the direction of the bearing 20. The function of this second seal lip 191 is to provide hydraulic tightness in regard to the lubricating fluid of the bearing 20.

Both of the seal lips 191 are in contact with the outer surface of the inner cylindrical ring 11 in such a way as to cause the contact to intervene between the edge of the seal lip 191 and a linear portion of the inner cylindrical ring 11. In this configuration, the seal lip 191 is bent as a result of the contact with the outer surface of the inner cylindrical ring 11. In particular, the seal lip 191 of each seal ring 19 oriented towards the inner channel 18 is bent and forms a concavity facing the annular space 15, and envisages an interaction that is variable according to the pressurization or resting condition present within the air channel, i.e., in the annular space 15. In the condition of pressure in the annular space 15, the seal lip 191 of the seal element 19, which rotates together with the outer cylindrical element, which is in turn fixed with respect to the rim C, rests on the outer surface of the inner cylindrical element 11, thus guaranteeing the pneumatic tightness. When the value of pressure returns to the value of ambient pressure, the contact between the seal lip 191 and the outer surface of the inner cylindrical element 11 once again is reduced to a contact line, in favour of the friction losses due to the sliding action of the seal itself.

Preferably, as shown in FIGS. 3-5, an annular spacer 13 is arranged in the annular space 15, configured for maintaining a concentricity with play with respect to the outer cylindrical ring 12. The annular spacer 13 maintains the distances between the two seal rings 19 and, by occupying the radially external portion of the annular space 15, in the part facing the outer cylindrical ring 12 defines a portion of said annular space 15, referred to as the outer annular space 14, which travels a circumference along the inner wall of the outer cylindrical ring 12 and intercepts said one or more outer channels 17. The outer annular space 14 is in pneumatic connection with the annular space 15 by means of one or more radial connection channels 16, arranged along the circumference of the annular spacer 13. Preferably, the annular spacer 13 has at least two radial connection channels 16, on two diametrically opposite sides of the annular spacer 13. The presence of a greater number of radial connection channels 16 may be preferred for reducing any load loss.

The environmental seal in regard to the outside world is guaranteed by two environmental seal rings 23, which are arranged in two respective seats, in the case exemplified in the figures respectively on the right of the tab 122 of the lid 22 and on the left of the first tab 110 of the inner cylindrical ring 11, and have the function of preventing entry into the rotary feed-through 10 of environmental elements, such as water, dust, or mud, preventing them from coming into contact with the bearings 20. Said environmental seal rings 23 also have the function of maintaining the hydraulic tightness in regard to the grease contained within the areas involved by the bearings 20, thus guaranteeing operation thereof over time. In particular, a first environmental seal ring 23 is housed in a seat defined by the radially external wall of the inner cylindrical ring 11 and by the radially internal wall of the outer cylindrical ring 12, on the side facing the rim C with respect to the first tab 110 of the inner cylindrical ring 11, whereas a second environmental seal ring 23 is housed in a seat defined between the radially external wall of the lid 22, a radially internal wall of the closing ring 21 and the axially external wall of the tab 121.

In particular, the environmental seal rings 23 are provided with a series of axial and radial seal lips such as to ensure an interaction with a constant level of interference within the range of tolerance defined by the system and exerted in regard to the counterpart made of metal material.

By way of example, at least one of said first and second environmental seal rings 23, preferably both of said first and second environmental seal rings 23, are compound seal rings, namely, comprising a first rotary part, i.e., a part designed to be fixed with respect to the elements of the rotary feed-through 10 that are fixed with respect to the rim C (in particular to the outer cylindrical ring 12 and to the closing ring 21, respectively), and a second static part, i.e., a part designed to be fixed with respect to the elements of the rotary feed-through 10 that are fixed with respect to the axle A. In addition, once again more preferably, on the side facing the axle A, the rotary feed-through 10 is provided with a casing (not shown), configured so as to protect the environmental seal rings 23 from exposure to extreme environmental elements, such as, for example, impact with stones during use.

Figure 6:
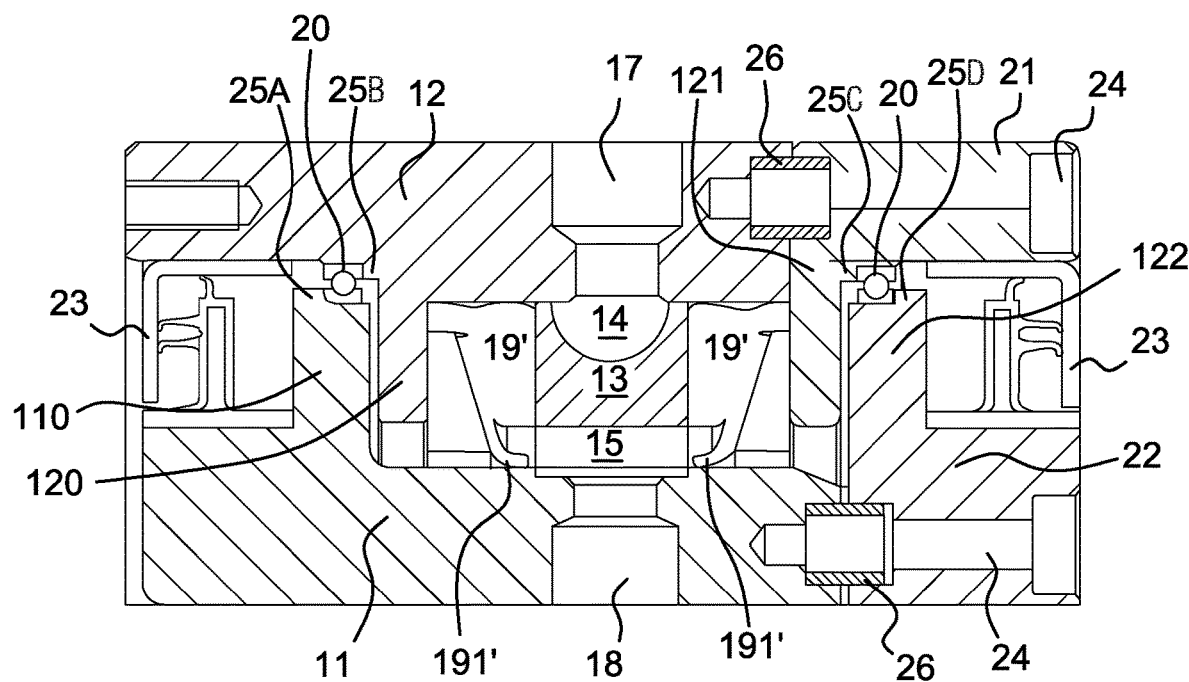
FIG. 6 is a sectional view of a detail of a portion of a rotary feed-through according to a second embodiment of the present invention, alternative to the embodiment shown in FIGS. 3-5.

The configuration just described with reference to FIGS. 3-5, constitutes a variant of the rotary feed-through 10 according to the present invention, which, however, can assume also different configurations, as for example in the case where seal rings 19' with a single lip seal element 191' are used, oriented in the direction of the annular space 15, as represented by way of example in FIG. 6 (where the elements corresponding to those shown with reference to FIGS. 3-5 are designated by the same reference numbers). In particular, according to this alternative embodiment, the seal lip 191' performs the dual task of keeping the annular space 15 under pressure and of providing hydraulic tightness in regard to the grease of the bearings 20. Said embodiment of the rotary feed-through 10 according to the present invention presents as advantage the possibility of reduction of the axial dimensions of the rotary feed-through 10, with the advantage of a greater simplicity of integration of the latter on the inner side of the wheel, i.e., with lower likelihood of interference with the original constituent components of the wheel and of the respective axle.

Figure 7:
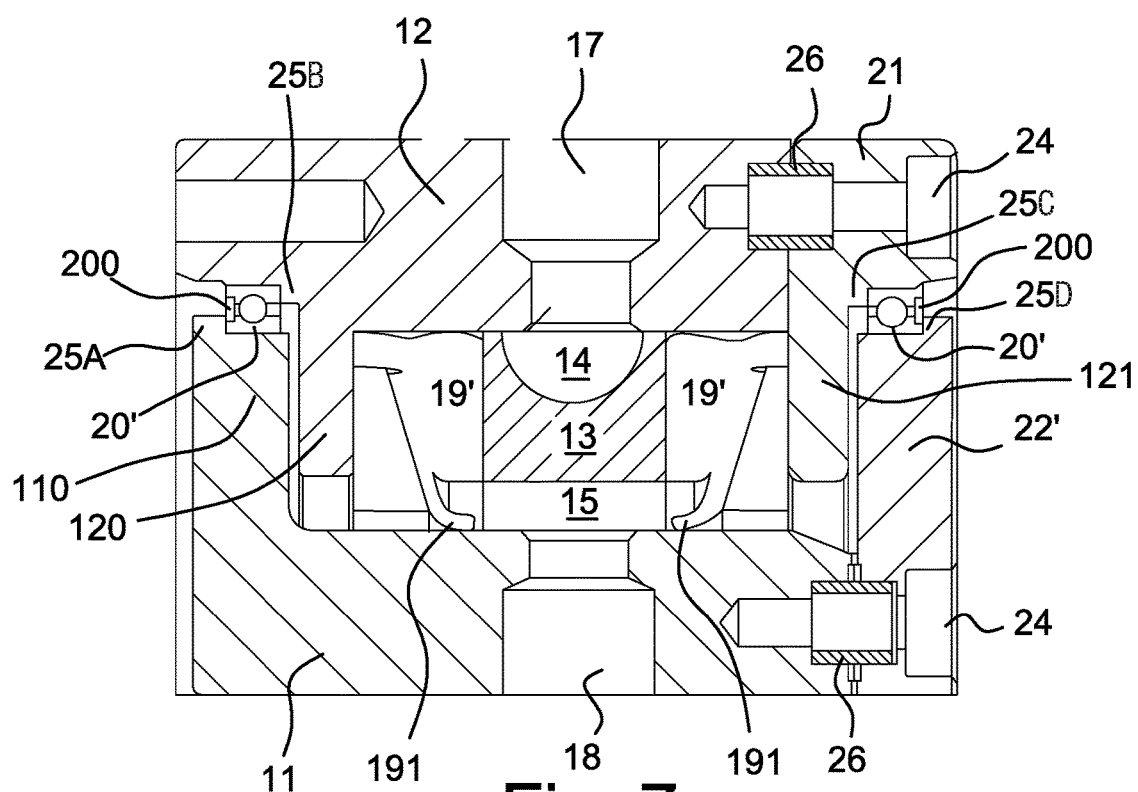
FIG. 7 is a sectional view of a detail of a portion of a rotary feed-through according to a third embodiment of the present invention, alternative to the embodiments shown in FIGS. 3-6.

With reference to FIG. 7, this shows a sectional view of a detail of a portion of a rotary feed-through 10 according to a third embodiment of the present invention, in which bearings 20' are used, in particular ball bearings, shielded on the outer side. In particular, the seal lip 200 fitted between the races of the bearing 20', according to this alternative embodiment of the present invention, performs the dual task of ensuring proper positioning of the inner ring 11 and of the closing ring 21 with respect to the outer ring 12 and to the lid 22 during rotation of the rotary feed-through 10, and of providing environmental tightness and grease tightness from the area of the bearing 20' itself. This variant constitutes a further advantage from the standpoint of system compactness. In fact, given that it is not necessary to provide seats for housing environmental seal rings 23 as those shown in the previous embodiments, it is possible to reduce the axial dimensions of the inner cylindrical ring 11 and of the outer cylindrical ring 12, on one side of the rotary feed-through 10, and of the closing ring 21 and of the lid 22 on the other side of the rotary feed-through 10, which do not need to comprise walls radially opposed to one another to house the environmental seal rings 23.

Figure 8:
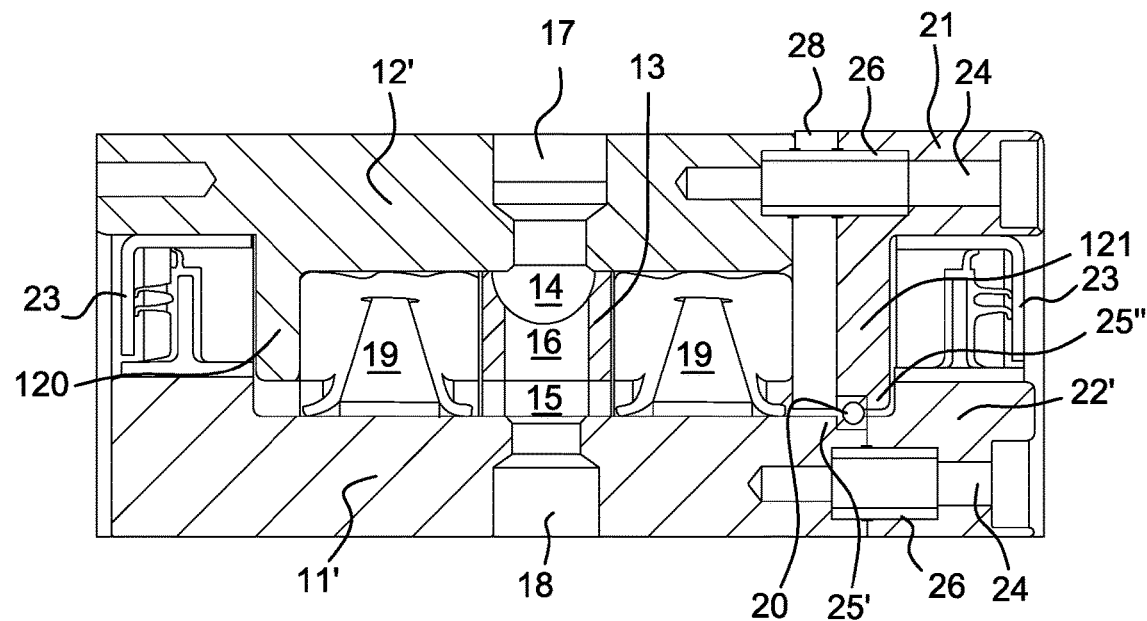
FIG. 8 is a sectional view of a detail of a portion of a rotary feed-through according to a fourth embodiment of the present invention, alternative to the embodiments shown in FIGS. 3-7.

With reference to FIG. 8 represented therein is a further embodiment of the rotary feed-through 10 according to the present invention, where the function of maintaining the mutual position between the inner cylindrical ring 11' and the outer cylindrical ring 12' is entrusted to a single bearing 20. According to this embodiment of the rotary feed-through 10 of the present invention, a single bearing 20 is arranged in a seat provided by means of a first shoulder 25' at the end further away from the rim C of the inner cylindrical ring 11' and delimited, on the side facing the rim C, by a lid 22'. On the side of the outer cylindrical ring 12', there is opposed, on the side facing in the direction of the rim C, a seat obtained by a second shoulder 25" made on a tab 121 and delimited, on the side facing in the direction opposite to the rim C, by an intermediate disk or ring 28, interposed between the closing ring 21 and the outer cylindrical ring 12'. Since the mutual position between the inner cylindrical ring 11' and the outer cylindrical ring 12' is guaranteed by the single bearing 20, the structure of the rotary feed-through 10 is simpler. For example, it is not necessary to envisage both of the opposed tabs 110 and 120 on the opposite ends of the inner cylindrical ring 11 and of the outer cylindrical ring 12, respectively (as shown in FIGS. 3 to 7), the presence of just the second tab 120 of the outer cylindrical ring 12' (FIG. 8), with the function of delimiting the seat for the seal rings 19, being consequently sufficient. This embodiment is hence simpler to implement and, consequently, economically more convenient.

Further embodiments may regard the case where the rotary feed-through is of the type that comprises two channels for passage of air, which may become necessary in the case where, for example, a mechanical valve is used that requires it, i.e., provided, for example, with a first channel dedicated to opening and closing of the passage of air and a second channel dedicated to introduction of air into the tyre. Also in this case, the same variants shown previously with reference to the embodiments with a single channel for the passage of air are possible.

Figure 9:
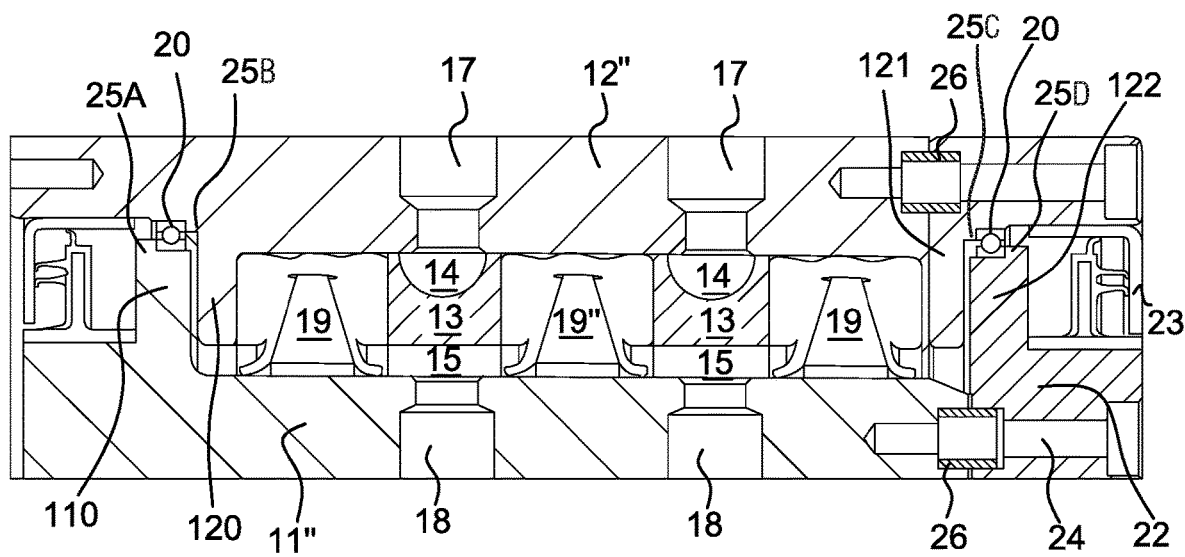
FIG. 9 is a sectional view of a detail of a portion of a rotary feed-through according to a fifth embodiment of the present invention, alternative to the embodiments shown in FIGS. 3-8.

By way of example, FIG. 9 is a sectional view of a detail of a portion of a rotary feed-through 10 according to a fifth embodiment of the present invention, where on the outer cylindrical ring 12" two distinct outer channels 17 are present and on the inner cylindrical ring 11" two corresponding inner channels 18 are present, connected by respective annular spaces 15, maintained pneumatically separate from one another by interposition of an intermediate seal ring 19", interposed between said annular spaces 15. In the embodiment shown in FIG. 9, the remaining characteristics of the rotary feed-through 10 are the same as those shown with reference to the embodiment represented in FIGS. 3-5. For example, a respective spacer ring 13 is arranged in each annular space 15, which in this case is essential for maintaining the intermediate seal ring 19" in position.

In this embodiment, as in the others provided in parallel to the embodiments shown in FIGS. 4-8, for the purposes of proper operation of the rotary feed-through 10 it is once again necessary for the annular spaces 15 to be kept separate to prevent the air of one of the channels from passing to the other channel. To obtain this result it is necessary for the intermediate seal ring 19" to be of the type able to ensure tightness on both sides, i.e., to be provided with seal lips 191 on either side, as described with reference to the embodiments shown in FIGS. 3-5 and 8.

Consequently, the housing seat defined between the inner cylindrical ring 11" and the outer cylindrical ring 12" must be of dimensions greater than those of the corresponding components described with reference to the previous embodiments.

The remaining part of the structure of the rotary feed-through remains identical to that of the rotary feed-throughs according to the embodiments described previously, or may vary according to the variants already shown with reference to FIGS. 6-8, the advantages in terms of simplification of the structure of the rotary feed-through being the same as the ones already described with reference to such embodiments.

In the embodiments of the present invention, described and shown by way of non-limiting example with reference to the attached figures, the closing ring 21 and the lid 22 are represented on the side of the rotary feed-through 10 further away from the rim C, but alternatively they could be arranged on the opposite side. At the same time, the second tab 120 of the outer cylindrical ring 12 and the first tab 110 of the inner cylindrical ring 11 can be arranged on the side further away from the rim C, with consequent modifications of the structure of the rotary feed-through 10 with respect to what is described and shown in the attached figures that are within the knowledge of a person skilled in the art.

The present invention has been described by way of non-limiting illustration according to its preferred embodiments, but it is to be understood that variations and/or modifications may be made by persons skilled in the art without thereby departing from the scope of the invention, as defined by the annexed claims.

The invention claimed is:

1. A rotary feed-through designed to transfer a fluid between two entities, one of which is in rotary motion with respect to the other, said rotary feed-through comprising two coaxial cylindrical components, defined, respectively, as inner cylindrical ring and outer cylindrical ring, which are free to turn with respect to one another and are respectively provided with one or more inner channels and one or more outer channels for the passage of said fluid, each of said one or more inner channels and each of said one or more outer channels being connected via at least one annular space, each annular space being axially delimited by two seal rings, said seal rings being housed in a cylindrical seat of said inner cylindrical ring or of said outer cylindrical ring, said cylindrical seat facing respectively radially outwards or inwards and respectively being axially delimited on one side by an axial abutment made of a single piece with or coupled to said inner cylindrical ring or said outer cylindrical ring, and on the other side by an axial abutment of a lid coupled in a removable way to said inner cylindrical ring or of a closing ring or of an intermediate ring, which are coupled in a removable way to said outer cylindrical ring, said seal rings being respectively interference fitted to said inner cylindrical ring or to said outer cylindrical ring and being provided with an elastic portion for contact with the surface respectively of said outer cylindrical ring or of said inner cylindrical ring; and said rotary feed-through comprising means that prevent the axial movement of said inner cylindrical ring with respect to said outer cylindrical ring, wherein at least one bearing is arranged between said inner cylindrical ring and said outer cylindrical ring, configured for supporting both the radial load and the axial load between said inner cylindrical ring and said outer cylindrical ring, the rotary feed-through being characterized in that wherein said inner cylindrical ring is provided with at least one first shoulder and said outer cylindrical ring is provided with at least one second shoulder that is arranged opposed to said at least one first shoulder, wherein said at least one bearing is arranged between said at least one first shoulder and said at least one second shoulder, so that said at least one bearing constitutes at least one axial constraint in regard to the possibility of mutual axial sliding between said inner cylindrical ring and said outer cylindrical ring, said at least one axial constraint being functional for maintaining the mutual position between said inner cylindrical ring and said outer cylindrical ring during mutual rotation, the rotary feed-through being characterized in that said cylindrical seat of said inner cylindrical ring or of said outer cylindrical ring is respectively axially delimited on one side by a first tab of said inner cylindrical ring or by a second tab of said outer cylindrical ring, and on the other side by a tab of a lid coupled to said inner cylindrical ring or by a tab of a closing ring or by an intermediate ring, coupled to said outer cylindrical ring.

2. The rotary feed-through according to claim 1, characterized in that said first tab of said inner cylindrical ring is made of a single piece with said inner cylindrical ring, whereas said second tab of said outer cylindrical ring is made of a single piece with said outer cylindrical ring.

3. The rotary feed-through according to claim 1, characterized in that said first shoulder is made on said first tab of said inner cylindrical ring, said first tab of said inner cylindrical ring being oriented radially towards the outside of the rotary feed-through, and in that said second shoulder is made on said second tab of said outer cylindrical ring, said second tab of said outer cylindrical ring being oriented radially towards the inside of the rotary feed-through, in such a way that said first tab of said inner cylindrical ring at least partially overlies, in a radial direction, said second tab of said outer cylindrical ring in the assembled configuration of the rotary feed-through, wherein the bearing arranged between said first shoulder of said first tab of said inner cylindrical ring and said second shoulder of said second tab of said outer cylindrical ring constitutes a first axial constraint in regard to the possibility of mutual axial sliding between said inner cylindrical ring and said outer cylindrical ring.

4. The rotary feed-through according to claim 3, characterized in that said first shoulder is made on said tab of said closing ring, said tab of said closing ring facing radially towards the inside of the rotary feed-through, and in that said second shoulder is made on said tab of said lid, wherein the bearing arranged between said first shoulder of said tab of said closing ring and said second shoulder of said tab of said lid constitutes a second axial constraint in regard to the possibility of mutual axial sliding between said inner cylindrical ring and said outer cylindrical ring, said second axial constraint being functional for maintaining, in co-operation with said first axial constraint, the mutual position between said inner cylindrical ring and said outer cylindrical ring.

5. The rotary feed-through according to claim 1, characterized in that said first shoulder is provided on said inner cylindrical ring, at the end delimited by said lid, and in that said second shoulder is made on said tab of said closing ring, wherein a single bearing is arranged between said first shoulder and said second shoulder, said single bearing having the function of maintaining the mutual position between said inner cylindrical ring and said outer cylindrical ring.

6. The rotary feed-through according to claim 1, characterized in that said elastic contact portion comprises at least one rotary sealing element formed by a seal lip protruding from said seal ring housed in said cylindrical seat of said inner cylindrical ring or of said outer cylindrical ring and with the end respectively in contact with the inner surface of said outer cylindrical ring or with the outer surface of said inner cylindrical ring.

7. The rotary feed-through according to claim 6, characterized in that said elastic contact portion of each seal ring comprises a first seal lip, which is oriented in the direction of a respective inner channel and which has the function of keeping under pressure said at least one annular space, and a second seal lip, which is oriented in the direction of said at least one bearing and has the function of providing hydraulic tightness in regard to lubricating fluids present in the area occupied by said at least one bearing.

8. The rotary feed-through according to claim 6, characterized in that said elastic contact portion of each seal ring comprises a single seal lip, which is oriented in the direction of said at least one annular space and which performs the dual task of keeping under pressure said at least one annular space and of providing hydraulic tightness in regard to lubricating fluids present in the area occupied by said at least one bearing.

9. The rotary feed-through according to claim 1, characterized in that it comprises two environmental seal rings, which are arranged respectively at the two axial ends of said rotary feed-through, with interference both with said inner cylindrical ring and with said outer cylindrical ring.

10. The rotary feed-through according to claim 9, characterized in that said environmental seal rings are compound seal rings, namely, comprising a first rotary part, fixed with respect to said entity in rotary motion, and a second static part, designed to be fixed with respect to the other entity.

11. The rotary feed-through according to claim 1, characterized in that said seal rings are kept separate from one another by an annular spacer, which is positioned in each annular space and defines an outer annular space set on the side of said annular spacer facing said outer cylindrical ring, said annular spacer comprising one or more radial connection channels between said annular space and said outer annular space.

12. The rotary feed-through according to claim 1, characterized in that a pair of bearings is arranged between said inner cylindrical ring and said outer cylindrical ring.

* * * * *